Figure 1:
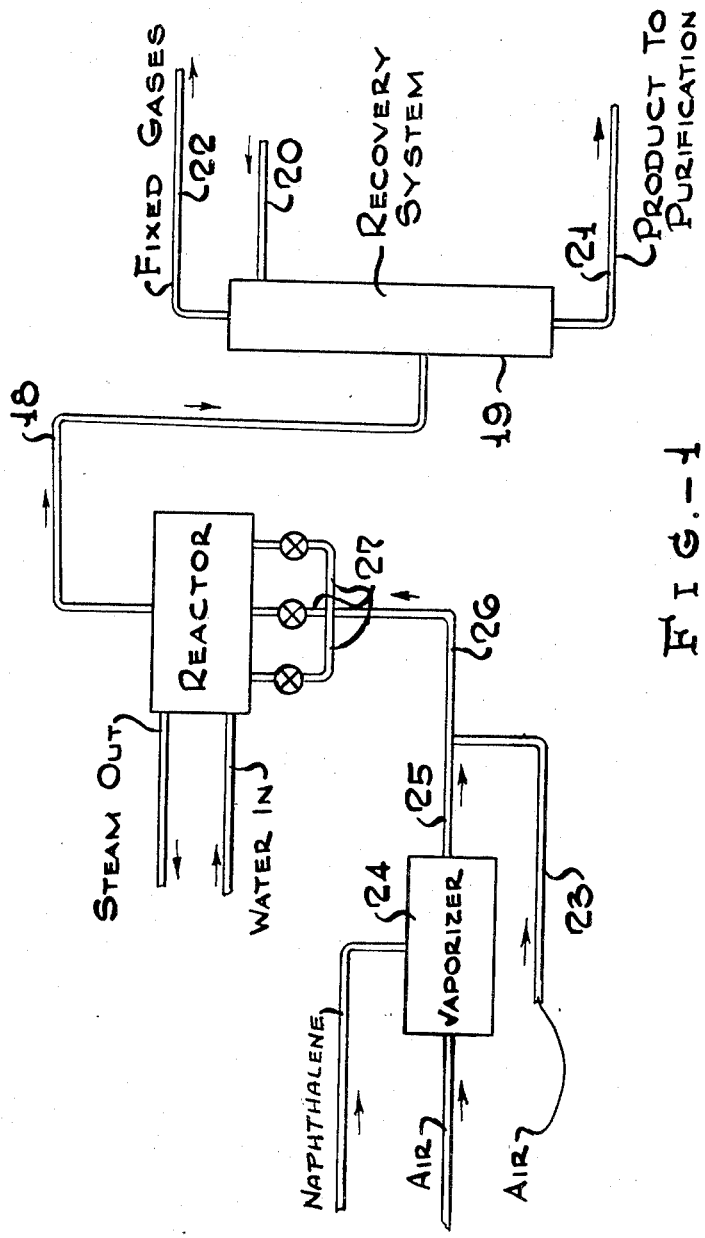

Nov. 29, 1949 W. F. ROLLMAN 2,489,347
PROCESS FOR OXIDATION OF AROMATIC HYDROCARBONS
Filed Aug. 11, 1945 3 Sheets-Sheet 3

Walter F. Rollman Inventor
By ―――― Attorney

Patented Nov. 29, 1949

2,489,347

UNITED STATES PATENT OFFICE 2,489,347

PROCESS FOR OXIDATION OF AROMATIC HYDROCARBONS

Walter F. Rollman, Cranford, N. J., assignor to Standard Oil Development Company, a corporation of Delaware Application August 11, 1945, Serial No. 610,346

2 Claims. (Cl. 260—342)

This invention relates to an improved method for the oxidation of aromatic hydrocarbons and pertains more particularly to the manufacture of phthalic anhydride.

The oxidation of aromatic hydrocarbons, such as naphthalene and orthoxylene, to phthalic anhydride and maleic anhydride is a well-known process. In the usual process a mixture of the aromatic hydrocarbon and air is passed through a bed of an oxide catalyst, such as vanadium oxide at a temperature between 570° and 1200° F. Because of the exothermic nature of the reaction it has been difficult to properly control the temperature of the reaction zone and prevent the formation of "hot spots" and local overheating. It has recently been proposed to overcome these difficulties by effecting the oxidation by means of a finely divided solid or powdered catalyst maintained as a turbulent dense phase mass in the reaction zone.

It has been considered necessary that the catalyst should be very fine, that is about 200 to 400 mesh, and should be used in relatively thick beds several feet high. However, such fine catalyst is difficult to maintain in the fluid state because of its tendency to go overhead with the effluent gases and to cling to the upper part of the reactor when the feed is introduced. Furthermore, the use of such thick beds increases materially the contact time of the hydrocarbon with the oxidizing medium resulting in increased formation of carbon dioxide and carbon monoxide due to a corresponding degradation of the desired products of oxidation.

It is therefore the main object of this invention to provide an improved process for the oxidation of aromatic hydrocarbons using powdered catalyst.

It is a further object of this invention to decrease the cost of manufacturing phthalic anhydride and maleic anhydride and to increase the yields of these compounds from aromatic hydrocarbons.

Other objects of the invention will be apparent as the detailed description proceeds.

In practicing this invention the oxidation of the aromatic hydrocarbons is effected by means of a relatively coarse catalyst in the form of spheres in a reaction zone under oxidizing conditions, with air and hydrocarbon vapors flowing concurrently upward through the masst of catalyst contained in the reaction zone. The flow of vapors and air is so controlled that the catalyst particles are constantly in motion.

It is a feature of this invention to increase the yields of desired reaction products by affording only brief contact of the reactant gases with the catalyst at uniform conditions of time and temperature. This is accomplished according to the present invention by materially decreasing the depth of the catalyst mass and, more particularly, by using a coarse catalyst.

Figure 2:
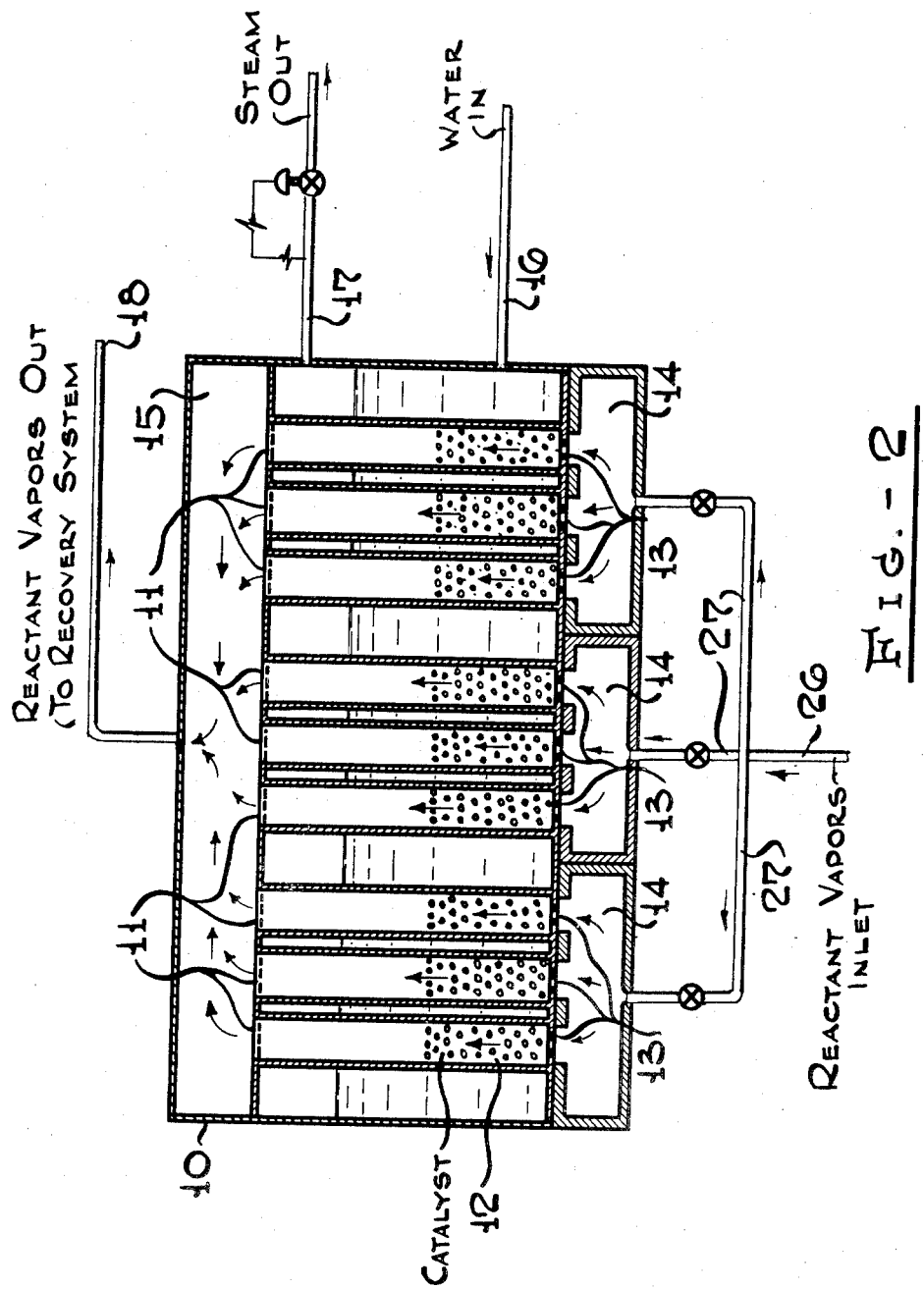
Figure 3:
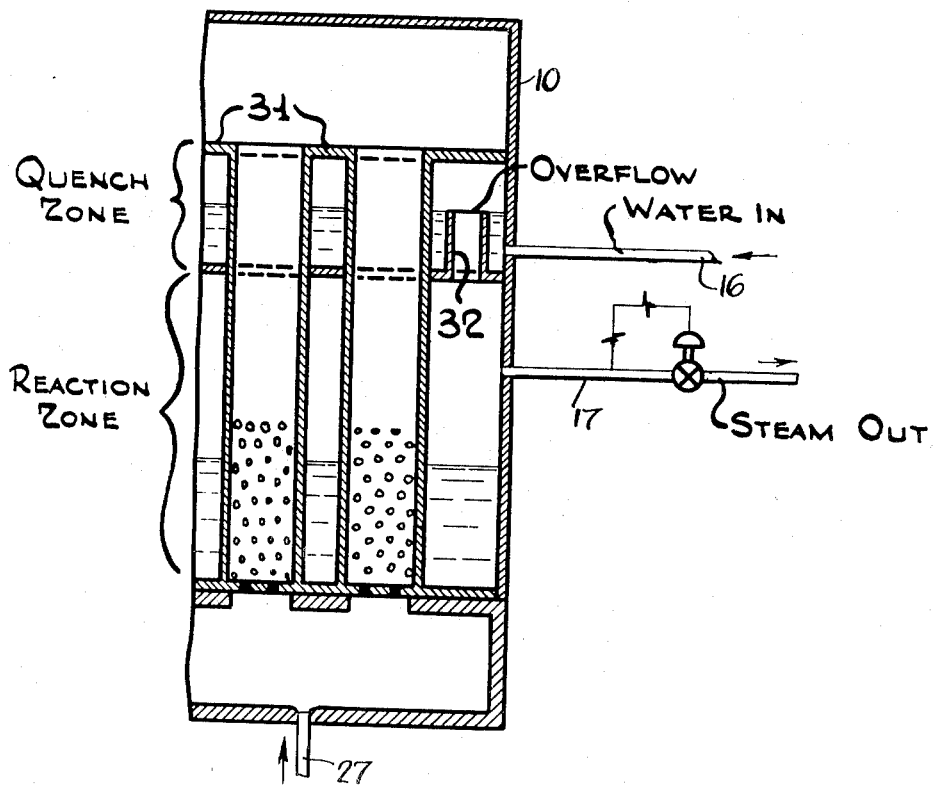

The invention will be more clearly understood from the following detailed description read in conjunction with the accompanying drawings which form a part of this specification wherein Figure 1 illustrates in schematic form one method for carrying out the invention, Figure 2 is a detailed view of the reactor of Figure 1 shown in section and Figure 3 illustrates a modified form of reactor.

As charging stocks for the process of this invention, there may be used any suitable aromatic hydrocarbon or aromatic hydrocarbon stock such as coal tar distillates, refractory stocks produced by catalytic cracking or reforming, or pure aromatic hydrocarbons such as orthoxylene, naphthalene, alkyl naphthalenes, etc.

As catalysts for this process there may be employed 6th or 7th group metal oxides either supported or unsupported on suitable carriers such as alumina, silica gel, pumice, kieselguhr, corundum, or any other known catalyst supports. It is a particular feature of this invention to employ unsupported catalyst in the form of spheres having a particle size between 10 and 60 mesh, preferably between 20 and 40 mesh. Such spheres may be prepared in any well known manner. A suitable method consists in obtaining particles of approximately the desired size and then fusing them into spheres by dropping the particles through a heated quartz tube. This is accomplished by initially fusing the oxide either alone or in admixture with any desired promoter, for example, potassium sulfate, in a muffle furnace and pouring the resulting melt onto a quartz surface where it is allowed to cool in thin sheets. The crystallized oxide is then ground and screened and particles of the desired size are fed slowly through a quartz tube heated to 1700°–1800° F. wherein the particles melt and assume a spherical shape. The melted particles are then solidified by a free fall of several feet through cool air. The cooled spheres thus formed are collected and screened to size.

The process will now be described in connection with the use of a fused spherical vanadium oxide catalyst of 20–40 mesh for the preparation of phthalic anhydride from naphthalene, although it is to be understood that the invention is not limited to any particular catalyst composition or preparation, or to the oxidation of any particular feed stock or to the use of any particular type of apparatus.

Referring, therefore, to the drawings there is provided a reactor 10 containing a plurality of parallel tubes 11, having a diameter of 1 to 6 inches, preferably 2 inches, containing layers of catalyst 12 placed on grids 13 and connecting with inlet headers 14 and exit header 15. Tubes 11 are surrounded by a liquid heat exchange medium such as boiling water, fused salts, mercury, diphenyl, diphenyl oxide and the like introduced through line 16 and removed through line 17. Water is preferred as the heat exchange medium because of its cheapness and abundance and heat recovery is relatively simple. Complete flexibility of throughput is achieved by segmenting inlet header 14 so that if desired only part of the tubes need be used. The tubes are conveniently arranged in separate groups to facilitate access of cooling water to tubes farthest from the jacket wall, and clean out doors (not shown) are provided in the top head to permit easy addition or withdrawal of catalyst. The reactor may be started up by preheating the catalyst with combustion gas from burners on each inlet line, and the inside walls of the inlet chamber are insulated to prevent overheating of the metal parts during this preheat period.

Air is introduced into the system through line 23 at a pressure of about 15 to 30 lbs./sq. in., and naphthalene vapors plus air are introduced from vaporizer 24 through line 25 and mixed with the air in line 23 in amounts of about 0.5 to 2.0 mol per cent, preferably 0.8 mol per cent naphthalene in air. The mixture of naphthalene and air is introduced into header 14 of reactor 10 through line 26 and branch lines 27. From header 14 vapors and air enter the bottom of each tube 11 through grids 13. A pressure drop of several pounds per square inch is maintained across grids 13 in order to insure uniformity of distribution of vapors to the several tubes 11. Catalyst contained in the lower portion of the tubes is more or less violently agitated by the rising vapors, but because of its coarse size is not carried overhead. Heat of reaction is removed through the walls of the tubes with the net result that vapors leave the top of the tubes at a temperature of about 400° to 600° F. Vapors and gases leave the tubes through header 15 and line 18 and are passed to recovery tower 19 where they are scrubbed with water introduced through line 20. A solution of phthalic and maleic anhydride is removed through line 21 and fixed gases are taken overhead through line 22. Relatively pure phthalic anhydride may be separated from other conversion products by conventional processes.

In Figure 3 is shown a modification of reactor 10 which increases the range of feasible operating conditions. Referring therefore, to this drawing, reactor 10 is shown fitted with a tube sheet 31 at a level corresponding approximately to the "quench section" of the tubes. Sheet 31 is provided with one or more overflow lines 32 connecting the space above with the space below. In this modification the heat exchange medium, e. g. water, is introduced through line 16 above the sheet and removed through line 17 below the sheet. The water admitted above the sheet cools the quench section of the tubes and the excess flows through the overflow line 32 into the lower section wherein the reaction zone temperature is controlled. Heat transfer from the reaction zone in the tubes may be varied over wide limits by raising or lowering the level of water in the jacket which in turn is determined by the rate of water addition in the quench zone. The reaction temperature in the tubes should be maintained between 900° and 1100° F., preferably about 1050° F. The vertical gas velocity in the reactor should be about 1 to 10 ft. per second, preferably 2 ft. per second. At such velocities the catalyst particles will be in motion but generally will not be entrained in the gases leaving the reactor so that substantially identical temperatures prevail throughout the entire mass.

An important feature of the invention is the very short contact time within the reactor which may range from 0.1 to 1 second. Optimum yields of phthalic anhydride are obtained with a contact time of about 0.5 second. A very convenient method of achieving this short contact time is by the use of relatively shallow dense phase catalyst masses. The depth of the catalyst mass in the tubes ranges from 3 to 36 inches and is preferably 14 inches.

The following data illustrate the unexpected advantages obtained in the oxidation of naphthalene to form phthalic anhydride by using short contact times, shallow dense phase catalyst mass, and catalyst in the form of spheres of 20–40 mesh fused vanadium oxide.

*Fluid catalytic vapor phase oxidation of naphthalene*

| Catalyst | Fused Vanadium Oxide | | | | | |
|---|---|---|---|---|---|---|
| Type | Microspheres, Supported on Corundum [1] | | | | | |
| Size mesh | 20–40 | | | 40–60 | 100–120 | (²) |
| Superficial Vapor Velocity, Ft./sec | 2 | 2 | 2 | 2 | 1 | 1 |
| Steam, mol percent of inlet vapor | 0 | 0 | 50 | 0 | 0 | 0 |
| Naphthalene Feed Conc., mol percent in air | 0.75 | 0.8 | 0.75 | 0.8 | 0.6 | 0.8 |
| Weight of feed/hr./wt. of catalyst in reactor | 0.18 | 0.2 | 0.09 | 0.2 | 0.1 | 0.15 |
| Contact time, sec | 0.5 | 0.5 | 0.3 | 0.3 | 0.5 | 0.9 |
| Avg. Depth of catalyst mass, in | 12 | 14 | 12 | 10 | 8 | 18 |
| Temperature, °F | 1,000 | 1,050 | 1,000 | 1,000 | 1,000 | 755 |
| Product Distribution: | | | | | | |
| Total Acids, mol percent | 93 | 96.5 | 94 | 77.5 | 80 | 74 |
| Phthalic Anhydride | 84 | 87 | 85 | 67 | 70.5 | 68 |
| Maleic Anhydride | 9 | 9.5 | 9 | 10.5 | 9.5 | 6 |
| Net CO+CO₂ | 5.5 | 2 | 5 | 9.5 | 17.5 | 24.5 |
| Conversion, percent | 99.5 | 100 | 100 | 87 | 96.5 | 100 |
| Selectivity to Phthalic Anhydride, percent | 84.5 | 87 | 85 | 77.0 | 71.5 | 68 |

[1] Difficulties in operating with this catalyst were encountered as it tends to "fluff up" and go overhead at reaction conditions; furthermore, it plates out on cooling surfaces included in the reactor to remove the heat of reaction from the system.

² 0–20 microns 50.5%; 20–40 microns 29.9%; 40–80 microns 14.0%; 80+ microns 5.6%.

From the above data it is clearly evident that unexpectedly high yields, high conversions and high selectivities are obtained by using microspherical catalysts in the range of 20–40 mesh for the oxidation of naphthalene. Furthermore the data conclusively show that the use of supported catalyst in the range of 100–200 mesh is not practical because of the low yields and because of the operating difficulties encountered and the use of supported non-spherical catalyst gives even lower yields. Thus 85–87% selectivity to phthalic anhydride at complete conversion is shown with the 20–40 mesh catalyst compared to 77% selectivity at 87% conversion with 40–60 mesh catalyst and only 71.5% selectivity at 98.5% conversion for the 100–200 mesh catalyst. While this invention is not intended to be limited by any theory as to why certain results are obtained, it is believed that the fact that conversion is incomplete with the finer catalyst in spite of the larger surface area, potentially available, can be attributed to the bypassing of the vapors around the catalyst and conversely the lower selectivity may mean that some vapors are momentarily trapped in the voids between the catalyst particles and are thus over contacted. In other words it appears that the surface of the 20–40 mesh catalyst is more efficiently used and contact of vapors and catalyst is more uniform than when finer catalyst is used.

While one specific process embodying the novel steps of the present invention, as well as one specific apparatus for carrying out the same has been described in considerable detail, it is to be understood that this description is illustrative only, and for the purpose of making the invention more clear, and it is not intended that the invention shall be construed as limited to details of the description except insofar as such limitations have been included in the terms of the following claims in which it is the intention to claim all novelty inherent in the process according to the present invention.

I claim:

1. The method of oxidizing a vaporizable aromatic hydrocarbon under controlled temperature conditions, which method comprises maintaining a mass of spherical particles of vanadium oxide catalyst of 20 to 40 mesh within a reaction zone that is in the lower portion of a vertical tube, passing oxygen-containing gas and vapor of the aromatic hydrocarbon upwardly through said mass of spherical particles at such a vertical velocity as to maintain said particles in motion without entrainment of said particles by gas and vapors that leave and pass above said reaction zone, and withdrawing said gas and vapors that leave the reaction zone from the upper part of the vertical tube.

2. The method as described in claim 1, wherein the aromatic hydrocarbon is naphthalene, said mass of spherical particles have a thickness between 3 and 36 inches with a diameter of 1 to 6 inches in said reaction zone, the vertical velocity of the oxygen-containing gas and the vapors of the aromatics hydrocarbon is between 1 and 10 feet per second to maintain said vapors in contact with the vanadium oxide for a period between $\frac{1}{10}$ and 1 second, and a temperature of 900° to 1100° F. is maintained in said reaction zone.

WALTER F. ROLLMAN.

REFERENCES CITED

The following references are of record in the file of this patent:

UNITED STATES PATENTS

| Number | Name | Date |
| --- | --- | --- |
| 1,978,506 | Punnett | Oct. 30, 1934 |
| 2,081,272 | Foster | May 25, 1937 |
| 2,215,095 | Drossbach | Sept. 17, 1940 |
| 2,366,372 | Voorhees | Jan. 2, 1945 |

FOREIGN PATENTS

| Number | Country | Date |
| --- | --- | --- |
| 170,022 | Great Britain | Oct. 7, 1921 |